(12) United States Patent
Sumitani et al.

(10) Patent No.: US 6,468,320 B1
(45) Date of Patent: Oct. 22, 2002

(54) FILTER UNIT AND FILTER

(75) Inventors: Tatsuaki Sumitani, Osaka (JP); Tomomi Takahashi, Okayama (JP); Masao Ieno, Okayama (JP); Yoshitaka Saito, Souka (JP)

(73) Assignees: Toyo Boseki Kabushiki Kaisha, Osaka (JP); Taisei Giken Co., Ltd., Tokyo (JP)

( * ) Notice: Subject to any disclaimer, the term of this patent is extended or adjusted under 35 U.S.C. 154(b) by 0 days.

(21) Appl. No.: 09/718,377

(22) Filed: Nov. 24, 2000

(30) Foreign Application Priority Data

Nov. 26, 1999 (JP) .............................. 11-336691

(51) Int. Cl.[7] .................... B01D 50/00; B01D 45/00
(52) U.S. Cl. ................ 55/320; 55/315.2; 55/337; 55/434.4; 55/440; 55/447; 55/462; 55/482; 55/482.1; 55/490; 55/490.1; 55/522; 55/529; 96/391
(58) Field of Search .............. 55/307, 308, 434.2, 55/434.4, 440, 447, 461, 482, 482.1, 490, 490.1, 522, 529, DIG. 31, 315, 315.1, 315.2, 337, 318, 320, 462; 96/391

(56) References Cited

U.S. PATENT DOCUMENTS

| | | | |
|---|---|---|---|
| 3,616,623 A | * 11/1971 | Reid | 55/440 |
| 4,019,883 A | * 4/1977 | Klomp | 55/434.2 |
| 4,390,351 A | * 6/1983 | Matsui et al. | 55/461 |
| 4,615,715 A | * 10/1986 | Seshamani | 55/434.4 |
| 4,838,907 A | * 6/1989 | Perry | 55/482 |
| 4,904,286 A | * 2/1990 | Magol et al. | 55/434.4 |
| 5,292,822 A | 3/1994 | Tanaka et al. | |
| 5,865,864 A | * 2/1999 | Brück | 55/482 |
| 6,068,674 A | * 5/2000 | Dullien et al. | 55/440 |

FOREIGN PATENT DOCUMENTS

| | | | |
|---|---|---|---|
| JP | 62 62181 | | 12/1987 |
| JP | 6 65810 | | 3/1994 |
| JP | 7 256022 | | 10/1995 |
| JP | 7-256022 A | * | 10/1995 |
| JP | 9-52913 | | 2/1997 |

* cited by examiner

*Primary Examiner*—Duane Smith
*Assistant Examiner*—Jason M. Greene
(74) *Attorney, Agent, or Firm*—Foley & Lardner (57) ABSTRACT

A filter unit for removing particulates in a gas to be treated, which unit includes a gas impermeable bulkhead that forms a channel through which the gas advances in the filter unit at least one round, and a filter member laminated on at least one side surface of the bulkhead without closing the channel. The filter unit or filter of the present invention reduces a load on a harm removing equipment, which in turn lowers the cleaning frequency and markedly prolongs the service life of the equipment.

5 Claims, 3 Drawing Sheets

FILTER UNIT AND FILTER

TECHNICAL FIELD OF THE INVENTION

The present invention relates to a particulates removing unit used for a pretreatment of an exhaust gas produced from a semiconductor production process, prior to subjecting the gas to a harm removing process. More particularly, the present invention relates to a removing unit particularly suitable for Chemical Vapor Deposition (hereinafter to be abbreviated as CVD) type steps involved in semiconductor production processes, to a filter unit capable of reducing a load on the removing unit itself and a load on a subsequent harm removing equipment, even when the amount of particulates, including impurities such as reaction product, other mist and dust in a discharged exhaust gas, is large, by enabling a long-term removal of the particulates, and to a filter incorporating the filter unit.

BACKGROUND OF THE INVENTION

The semiconductor production process includes an ion implantation method, a metal etching method using aluminum and the like, a CVD method and the like. In any of these methods, an exhaust gas is generated, which contains a toxic gas such as hydrofluoric acid, silane gas, tetraethoxysilane (hereinafter to be abbreviated as TEOS), ammonia and the like, particulates including impurities such as reaction product and the like, and other mist and dust. To remove the particulates, a harm removing equipment is generally installed.

Conventional harm removing equipments remove particulates by adsorption thereof onto an adsorbent (e.g., ion exchange resin and zeolite), adsorption thereof onto water by the use of a water scrubber, through decomposition by combustion by a burner, and the like. When particulates are contained in an exhaust gas, however, the harm removing equipment using an adsorbent defectively shows a greater pressure loss per unit area, and the harm removing equipment using a water scrubber defectively necessitates disposal of sludge of adsorbate, and the harm removing equipment by combustion defectively shows a clogged nozzle of a burner and staining of a combustion chamber. These defects in turn give rise to the need of periodical cleaning of the harm removing equipment and exchange of an equipment, on which a great load has been applied. In particular, the CVD method is associated with a large amount of particulates in an exhaust gas from the semiconductor production process, which increases cleaning frequency and noticeably shortens the service life of the equipment.

The present inventors have proposed a vacuum exhaust gas filter system in JP-A-7-256022 as a pretreatment device for the above-mentioned harm removing equipment. They have later found that a filter used in a semiconductor production process by the CVD method becomes clogged in about 3 days to 3 weeks. Accordingly, the development of a filter unit is desired, which is applicable even when the amount of particulates in an exhaust gas is large.

It is therefore an object of the present invention to provide a filter unit capable of removing a great amount of particulates in an exhaust gas produced in a semiconductor production process and the like, over a long period of time, thereby facilitating maintenance of the harm removing equipment and reducing the cost born by the user, and to provide a filter using this filter unit.

SUMMARY OF THE INVENTION

Such object can be conveniently achieved by the present invention described in the following.

(1) A filter unit for removing particulates in a gas to be treated, which comprises a gas impermeable bulkhead that forms a channel through which the gas advances in the filter unit at least one round, and a filter member laminated on at least one side surface of the bulkhead, without closing the channel.

(2) A filter unit preferably having a filter member containing a nonwoven fabric having a density of 0.005–0.4 g/cm$^3$, which fabric is prepared using a fiber having 0.1–8 mmol/g of an ionic group.

(3) The filter unit preferably having a means for retaining or circulating a coolant.

(4) A filter comprising the filter unit of (1) above and a second filter unit, wherein the second filter unit has a cylindrical filter member having a central duct, the filter unit of (1) above and the second filter unit being connected to each other, such that the gas that has passed through the filter unit of (1) above proceeds to the central duct from the periphery of the cylindrical filter member.

(5) The filter wherein the above-mentioned filter member in the filter unit of (1) above and/or the above-mentioned cylindrical filter member (4) comprise(s) a nonwoven fabric having a density of 0.005–0.4 g/cm$^3$, which fabric is prepared using a fiber having 0.1–8 mmol/g of an ionic group.

(6) The filter wherein the filter unit of (1) above and/or the second filter unit of (4) above have/has a means for retaining or circulating a coolant.

DETAILED DESCRIPTION OF THE INVENTION

The filter unit and the filter of the present invention are described in detail in the following by referring to the drawings. The filter unit of the present invention is characterized by coil-like advancing of a gas to be treated (e.g., exhaust gas) along and in contact with a filter member through a channel at least one round.

Figure 1:
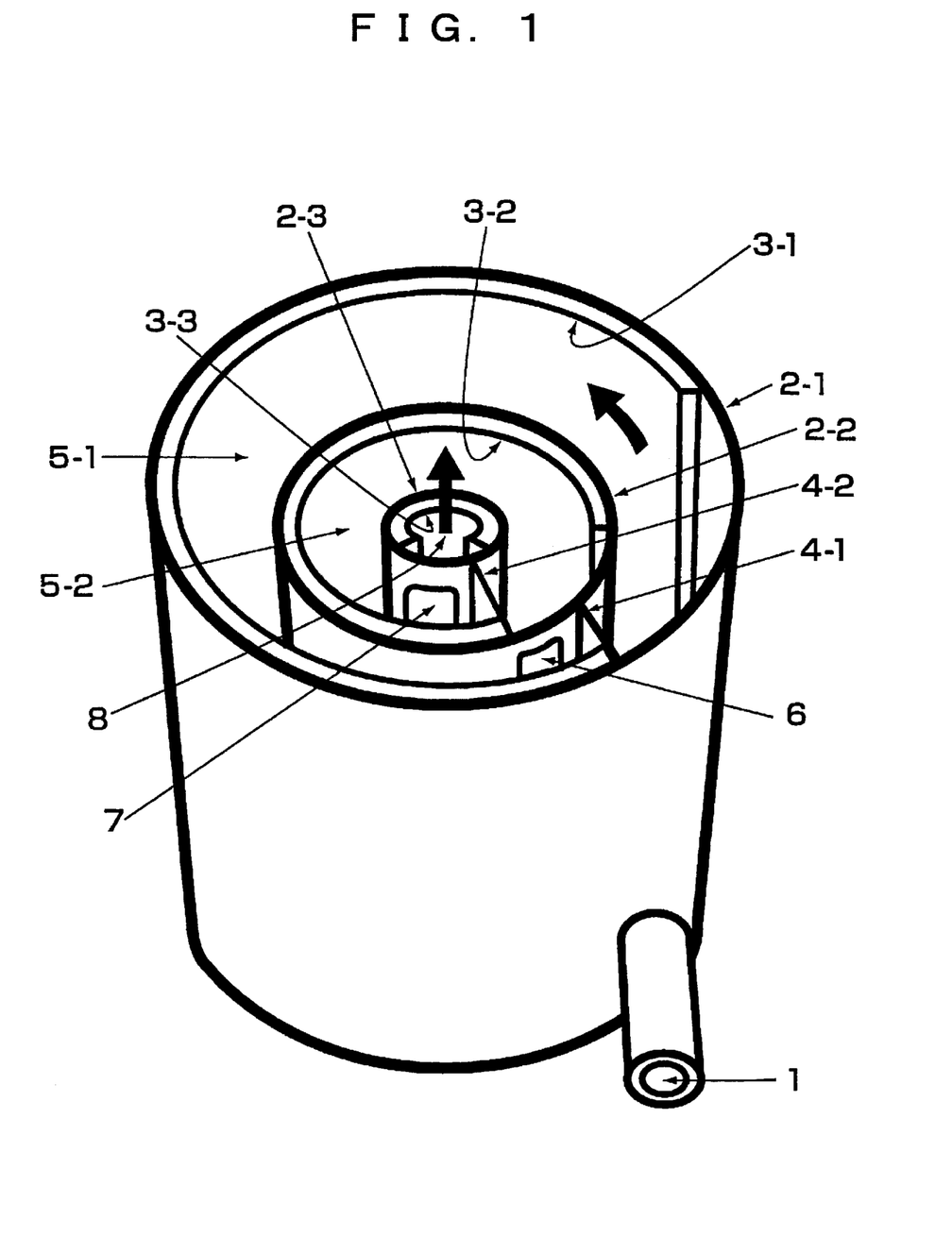
FIG. 1 shows a perspective view of a coil filter unit.

FIG. 1 shows the essential aspect of the present invention, which is a perspective view showing the basic concept of one embodiment of the filter unit (hereinafter to be also referred to as a coil filter unit). The coil filter unit has a gas impermeable lower bottom and an upper cover. In FIG. 1, the upper cover has been removed.

In FIG. 1, a gas inlet 1 protrudes to this side from the lower side of a cylindrical casing, through which a gas to be treated flows into the casing. The cylindrical casing is a first gas impermeable bulkhead 2-1. In the bulkhead 2-1, a first gas shielding plate 4-1 is formed in contact with an inner wall of the bulkhead 2-1. This plate 4-1 having the same height as the inner wall of the bulkhead 2-1 is disposed near an opening of the gas inlet 1 into the bulkhead 2-1 and at an uninfluencing position for the inflow of the gas. A first filter member 3-1 having the same height as the inner wall of the bulkhead 2-1 is laminated on the inner wall and extends counterclockwise to the opening of the gas inlet 1, from a position some distance away from the opening, until it reaches the gas shielding plate 4-1.

A second bulkhead 2-2 having the same height as the bulkhead 2-1 and a smaller diameter than the bulkhead 2-1 is formed in the first bulkhead 2-1. The outer wall of the bulkhead 2-2 is in contact with the first gas shielding plate 4-1. By this constitution, the first coil-like zone 5-1 becomes a channel of a gas to be treated. In this Figure, the gas to be treated, which is press injected into the first bulkhead 2-1 from the lower right gas inlet 1, or fed into the first bulkhead 2-1 by the suction from an exhaust channel 8 to be mentioned later (hereinafter the press injection and feeding are to be also generally referred to as introduction) spreads vertically and then goes counterclockwise (direction of arrow) along the first filter member 3-1 until it is stopped by the first gas shielding plate 4-1.

The second bulkhead 2-2 is distinct from the first bulkhead 2-1 because it has an oblong window formed near the first gas shielding plate 4-1 and at a position clockwise from the gas shielding plate 4-1 (on the left in FIG. 1). This window is a second gas inlet 6, through which a gas to be treated enters the second bulkhead 2-2 from the first coil-like zone 5-1. Like the first bulkhead 2-1, a second gas shielding plate 4-2 is formed in contact with an inner wall of the bulkhead 2-2. This plate 4-2 having the same height as the inner wall of the bulkhead 2-2 is disposed near an opening of the second gas inlet 6 and at an uninfluencing position for the inflow of the gas. A second filter member 3-2 having the same height as the inner wall of the bulkhead 2-2 is laminated on the inner wall and extends counterclockwise to the opening of the second gas inlet 6, from a position some distance away from the opening, until it reaches the gas shielding plate 4-2.

Like the first bulkhead 2-1, a third bulkhead 2-3 having the same height as the bulkhead 2-2 and a smaller diameter than the bulkhead 2-2 is formed in the second bulkhead 2-2. The outer wall of the bulkhead 2-3 is in contact with the second gas shielding plate 4-2. By this constitution, the second coil-like zone 5-2 becomes a channel of a gas to be treated. The introduced gas to be treated proceeds counterclockwise from the second gas inlet 6 in the second coil-like zone 5-2 along the second filter member 3-2 and reaches the second gas shielding plate 4-2.

The third bulkhead 2-3 has a third gas inlet 7 formed near the second gas shielding plate 4-2 and at a position clockwise from the gas shielding plate 4-2 (on the left in FIG. 1). A third filter member 3-3 is laminated on the inner wall of the bulkhead 2-3 at an uninfluencing position for the inflow of the gas from the gas inlet 7.

Unlike the first and second coil-like zones 5-1 and 5-2, the cavity formed inside the third filter member 3-3 does not promote the advance of a gas flow. Therefore, the gas does not go around and the cavity becomes an exhaust channel 8, through which the gas to be treated is discharged in the direction of an arrow, shown in the center of the Figure, for the treatment in the next step. The third bulkhead 2-3 is also referred to as an "exhaust pipe" that discharges the gas. The third filter member 3-3 may not be included.

As mentioned earlier, an upper cover (not shown) has been removed in this Figure. Naturally, the third bulkhead (or exhaust pipe) 2-3 is open. As mentioned above, the third bulkhead 2-3 has the same height as the second bulkhead 2-2. However, solely the third bulkhead 2-3 (exhaust pipe) can be higher than the upper cover. The lower surface of the upper cover and the upper end face of, for example, the bulkhead and gas shielding plate may be sealed with a suitable filler, a packing, an adhesive and the like, so that a gas to be treated will not leak from the filter unit system.

Referring to this Figure, when the gas to be treated has a high temperature, a cooling jacket (not shown) may be set on the outer periphery of the first bulkhead 2-1. The cooling jacket retains or circulates a coolant that cools the filter unit, and can be a known one. The coolant is not subject to any particular limitation but water is preferably used.

The gas to be treated flows in this filter unit as follows. That is, an exhaust gas containing particulates including impurities such as reaction product, other mist and dust is introduced into the first bulkhead 2-1 via the gas inlet 1. The gas enters the first coil-like zone 5-1, makes one round counterclockwise while being in contact with the first filter member 3-1, and, via the second gas inlet 6, makes 0.8 round counterclockwise through the second coil-like zone 5-2. The gas is discharged from the system from an exhaust channel 8 via the third gas inlet 7 and introduced into a subsequent harm removing equipment.

When particulates to be removed have too small a diameter to remove with the above-mentioned coil filter unit, according to the present invention, a filter containing a second filter unit in combination with the coil filter unit may be prepared, which makes a gas to be treated advance from the outer periphery of a cylindrical filter member into the central duct. In this case, a gas to be treated, which is exhausted from the exhaust channel 8 of the coil filter unit in the above-mentioned embodiment, is led to a harm removing equipment via the second filter unit.

Figure 2:
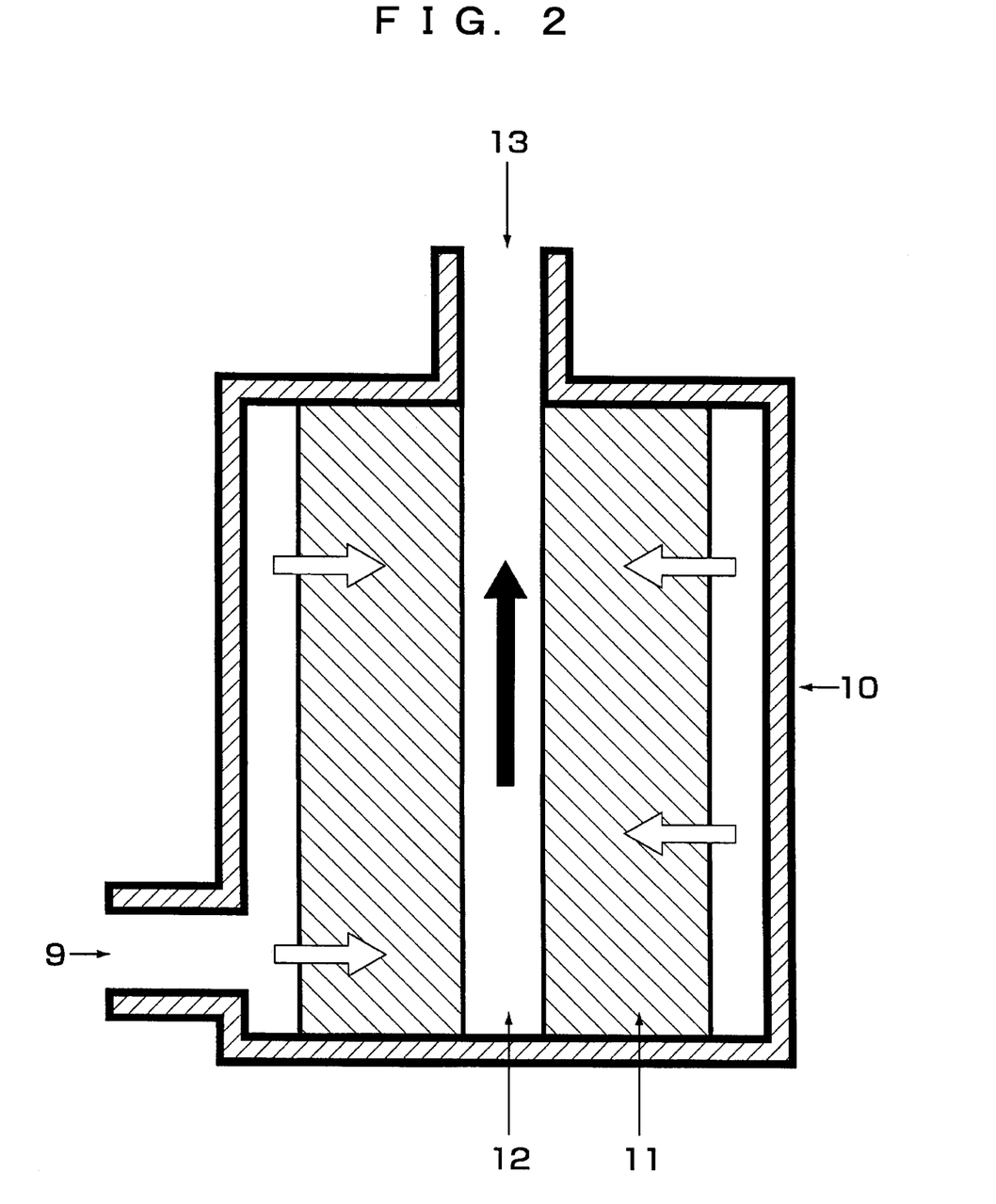
FIG. 2 shows a longitudinal section of a cylindrical filter unit.

One embodiment of a second filter unit, wherein a gas to be treated advances from the outer periphery of a cylindrical filter member into the central duct, is explained in the following. FIG. 2 is a longitudinal sectional view of a cylindrical filter unit, and shows a longitudinal sectional view along the virtual vertical plane that passes through a gas inlet 9 and an exhaust channel 13 of the cylindrical filter unit housing the cylindrical filter member 11. In FIG. 2, a gas inlet 9 protrudes at the lower left, and is connected to an exhaust channel 8 of the coil filter unit, as can be understood from the foregoing description. The gas inlet 9 of the cylindrical filter unit and the exhaust channel 8 of the coil filter unit are connected via a flexible tube, a rigid tube and the like.

In the cylindrical filter unit, a container 10 accommodates a cylindrical filter member 11, and a top board and the bottom board of the container 10. The upper end face and the lower end face of the filter member 11 are respectively adhered closely.

Because of the tubular shape of the cylindrical filter member 11, it has an open space in the center thereof. In the present invention, the space is referred to as a central duct 12, whose upper opening communicates with an exhaust channel 13 of the cylindrical filter unit. The exhaust channel 13 evidently advances toward a harm removing equipment (not shown). The container 10 can additionally have the aforementioned cooling jacket as an outer sheath, or where the case demands, on the inside of the container (not shown).

According to the filter unit, a gas to be treated enters a gas inlet 9, advances around the filter member 11, moves onward through the inside of the filter member 11 as shown with an outline arrow, gathers in the central duct 12 and heads toward the exhaust channel 13 as shown by a black thick arrow.

Figure 3:
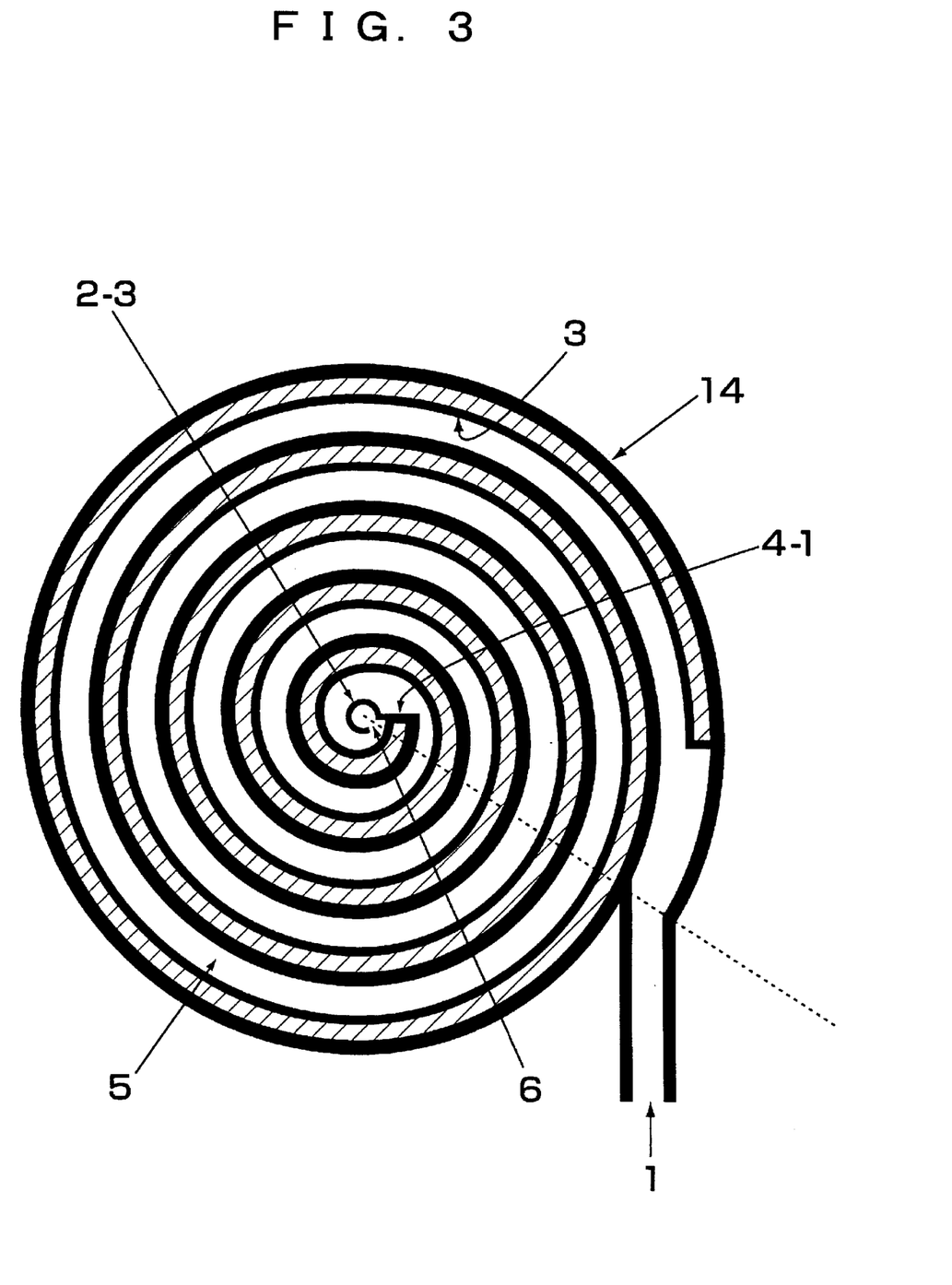
FIG. 3 shows a transverse section of another embodiment of the coil filter unit.

FIG. 3 shows a transverse sectional view of another embodiment of the coil filter unit, and shows a transverse sectional view along the virtual horizontal plane that goes through a gas inlet of the coil filter unit. In this embodiment 2 of the coil filter unit, the unit is cylindrical and has an upper cover and a lower bottom having a similar shape as in the embodiment 1 shown in FIG. 1.

In this Figure, a gas inlet 1 protrudes at the lower right. In the embodiment 1 shown in FIG. 1, plural concentric bulkheads are used. In the embodiment 2 shown in FIG. 3, the bulkhead forms a coil-like shape. In this embodiment 2, the bulkhead is particularly referred to as a support wall 14 of the filter member. The inner wall surface of the curved support wall 14 has a filter member 3 laminated thereon, forming a coil-like zone 5 as a channel.

Because the support wall 14 has a continuous coil-like shape, the filter unit contains only the first gas shielding plate 4-1 and the second gas inlet 6, corresponding to the first gas shielding plate and the second gas inlet, respectively, in the embodiment of FIG. 1, which are located in the center thereof. The innermost member having a gas inlet 6 and connected with the end of the support wall 14 via the gas shielding plate 4-1 is, like the third bulkhead 2-3 in the embodiment of FIG. 1, an exhaust pipe 2-3. In this case, only one coil-like zone 5 is involved, because the flow is stopped only once by a gas shielding plate 4-1. The passage from the exhaust pipe 2-3 to a harm removing equipment, and the aforementioned cooling jacket are the same as in embodiment 1.

In this case, a gas to be treated makes 5 rounds and in the embodiment 1 shown in FIG. 1, the gas makes 1.8 rounds. As used in the present invention, by the round is meant a round frequency of a gas through the channel from the opening of the gas inlet to the exhaust pipe, as counted at a virtual straight line (in FIG. 3, shown with a dotted line) connecting the center of the exhaust pipe and the opening of the gas inlet leading to this unit in a transverse section on the horizontal plane containing the gas inlet of the filter unit. In the present invention, the gas makes at least one round, preferably 1.5–10 rounds. This round frequency is appropriately determined in consideration of the kind of exhaust gas from the semiconductor production process, the gas volume, the amount of particulates and the particle size. When the round frequency is less than one, the removal efficiency of the particulates contained in the exhaust gas unpreferably becomes insufficient. When it exceeds 10 rounds, the apparatus would require more steps to produce and the production cost becomes disadvantageously higher.

The filter member used for the coil filter unit and cylindrical filter unit is made from a fiber material superior in chemical resistance and heat resistance to stand the exhaust gas generally having a high temperature. The filter member traps particulates including impurities such as reaction product, other mist and dust, while the exhaust gas advances in contact with the filter member. As long as the filter member is made from a fiber material satisfying the above requirements, the form of the filter member is optional. In view of facilitated production, a nonwoven fabric is preferably used. Particularly preferred is a filter member made from a nonwoven fabric having a density of 0.005–0.4 g/cm$^3$, which is prepared by processing a fiber having 0.1–8 mmol/g of an ionic group.

The ionic group in the present invention becomes anion or cation by being ionized in an aqueous medium. Examples thereof include anionic groups such as carboxyl group, sulfonic acid group, phosphoric acid group and the like, and cationic groups such as amino group, secondary amino group, tertiary amino group, quaternary ammonium group and the like.

The fiber having an ionic group is not subject to any particular limitation. Examples thereof include a fiber having a carboxyl group [e.g., commercially available LANSEAL, Toyobo Co., Ltd., BELL OASIS, Kanebo, Ltd.], a fiber having a carboxyl group and an amide group [e.g., commercially available MOIS CARE, Toyobo Co., Ltd.], and a fiber having an amino group [e.g., commercially available N-63, Toyobo Co., Ltd.]. The above-mentioned carboxyl group includes a salt type carboxyl group represented by -COOX, wherein X is an alkali metal (e.g., Li, Na, K and the like), alkaline earth metal (e.g., Be, Mg, Ca, Ba and the like), other metals (e.g., Cu, Zn, Al, Mn, Ag, Fe, Co, Ni and the like), and organic cation such as $NH_4$, cationic amine and the like.

The fiber having a carboxyl group can be produced according to the method disclosed in JP-B-62-62181 and JP-A-6-65810, a fiber having a carboxyl group and an amide group can be produced according to the method disclosed in U.S. Pat. No. 5292822, and a fiber having an amino group can be produced according to the method disclosed in JP-A-9-52913.

The fiber constituting the filter member preferably has an ionic group in a total amount of 0.1–8 mmol/g. When the total amount of the ionic group is less than 0.1 mmol/g, the removal efficiency of the particulates in the exhaust gas unpreferably becomes insufficient. When it exceeds 8 mmol/g, the removal efficiency of the particulates does not change. In addition, a material having a high total amount of the ionic group shows insufficient fiber strength, which in turn may result in lower strength of the filter member. Even if a fiber does not contain an ionic group at a level defined in the above, it may show the same effect as achieved by a fiber having an ionic group at a level defined in the above, when the fiber surface layer is activated to have a charge. Such fiber is exemplified by commercially available Zeta Plus (trademark) manufactured by Cuno K. K.

According to the present invention, the use of a filter member 100% made from the above-mentioned fiber is desirable. For an improved processability of the nonwoven fabric, a fiber such as polyester, polypropylene, rayon, acrylic, nylon, polyamide and the like may be admixed. A nonwoven fabric can be processed by a typical processing method for a nonwoven fabric, such as needle punch, chemical bonding, thermal bonding, spun bonding and the like.

A filter member made from a nonwoven fabric having a density of 0.005–0.4 g/cm$^3$ is preferably used. When the filter member made by processing a nonwoven fabric has a density of less than 0.005 g/cm$^3$, the processing of nonwoven fabric itself, forming of a nonwoven fabric into a filter member, and incorporation of a filter member into a filter unit become unfeasible. In addition, the filter member has less strength. When the density exceeds 0.4 g/cm$^3$, an exhaust gas cannot go into the filter member easily, which in turn results in smaller amount of trapped particulates and lower removal efficiency. The present invention encompasses an embodiment involving a density gradient, wherein the outside of the filter member (channel side opposite to bulkhead) has a low density and the inside (bulkhead side to be laminated) has a high density, thereby making the filter member as a whole have a density in the above-mentioned range.

With regard to the coil filter unit, a filter member can be laminated on a bulkhead by, for example, bending a planar filter member, so that it would follow the inner wall of the bulkhead, inserting the filter member into the bulkhead, and adhering the filter member by heating or with an adhesive, or by adhering the filter member to the inner wall of the bulkhead with an adhesive tape, magic tape (trademark) and the like. Alternatively, a filter member and a bulkhead can be integrated by holding them together with a clip, or by inserting the filter member between a metal net (guide member) and the bulkhead. When the filter member is not planar, it can be made planar by moistening the fiber with water and heat-drying the fiber by a heat press, or by blending a thermal bonding fiber and thermally bonding the fiber by a heat press. To increase the surface area of the filter member, the outside (channel side opposite to the bulkhead) may be corrugated, made to have an uneven surface, or made to have grooves.

The thickness of the nonwoven fabric is not subject to any particular limitation as long as the gas channel area of the coil-like zone in the coil filter unit is not smaller than the piping area of the exhaust gas inlet toward the unit. In other words, the thickness of the filter member is not subject to any particular limitation as long as the longitudinal sectional area of the coil-like zone, when the coil filter unit is cut along the virtual vertical plane passing through the center of the coil filter unit, is not smaller than the area of the opening of the gas inlet toward the unit.

When the particulates in a gas to be treated have a greater particle size, the coil filter unit can remove most of the particles. In this case, a cylindrical filter unit is not necessary. However, when the gas to be treated contains mist-like particulates that cannot be removed by a coil filter unit, a filter having a coil filter unit and a cylindrical filter unit in combination is preferably used, wherein the gas is passed through the coil filter unit and then the cylindrical filter unit.

The cylindrical filter member to be housed inside the cylindrical filter unit can be processed by, for example, a method described in JP-A-7-256022. To be specific, a fiber is moistened, packed in a hollow cylinder molding machine, and dried with hot air at 60° C. Alternatively, a fiber is blended with a thermal bonding fiber and bonded by heating, or a fiber is formed into a nonwoven fabric or yarn and wound around a cylindrical substance.

According to the present invention, as long as the channel is not clogged, or as long as a channel, through which a gas to be treated advances in contact with the filter member, is secured, a filter member need only be laminated on at least one side of the bulkhead. Therefore, in FIG. 1 and FIG. 3, a filter member is laminated only on the inner wall of the bulkhead. In addition, a filter member can be laminated not only on the inner wall but also on the outer wall of the bulkhead. Alternatively, a filter member can be laminated only on the outer wall of the bulkhead in the filter unit. In view of the fact that the particulates in a gas to be treated collide with the inner wall of the bulkhead due to the centrifugal force, a filter member is preferably laminated at least on the inner wall of the bulkhead.

It sometimes happens that the components vaporized due to the high temperature heat of the gas to be treated, which is produced from a semiconductor production process and the like, are cooled in a piping and precipitate as particulates. The present inventors have empirically found that the promotion of the precipitation leads to an improvement in the removal efficiency. For the promotion of precipitation, the entire filter unit is preferably cooled. This is done by cooling the above-mentioned cooling jacket with a coolant, which is preferably water.

The bulkhead of a coil filter unit and a container 10 of a cylindrical filter unit are desirably made from a material which is gas impermeable, hardly corroded by a gas to be treated and is capable of standing the temperature of the gas to be treated. For example, a stainless container and a container applied with glass lining or teflon coating are preferably used. In addition, the contact part between the coil filter unit and the cylindrical filter unit is preferably sealed with Teflon, glass fiber and the like, thereby to prevent leakage of the gas to be treated.

The mechanism of the filter unit of the present invention, by which particulates including impurities (e.g., reaction product, other mist and dust) in a gas to be treated (e.g., a discharged exhaust gas from a semiconductor production process) are removed quickly and certainly has not been fully elucidated, but the following is postulated. The temperature of a gas to be treated, which is discharged from a semiconductor production process and the like, becomes lower to precipitate particulates in the form of mist and dust. In the coil filter unit shown in FIG. 1, the precipitated particulates collide with a filter member by the action of a centrifugal force. The collided particulates adhere to the filter member or fall down to accumulate on the bottom of the filter member.

A fiber having an ionic group, which constitutes a filter member, has been confirmed to promote agglomeration of the mist and dust in an exhaust gas, and considered to contribute to the improvement of the removal efficiency of particulates. When bulky particles are contained in a large amount, a coil filter unit alone can show high removal efficiency, but when mist-like particulates are contained, a coil filter unit alone cannot remove all the particulates. In this case, the gas is desirably passed through a cylindrical filter unit. A cylindrical filter member using a fiber having a given total amount of an ionic group promotes agglomeration by the action of a fiber having an ionic group, attaching the particulates to the filter member for removal.

The present invention is explained in detail by referring to examples. The present invention is not limited by these examples in any way. The methods for evaluating the properties are described in the following.

(1) Total Amount of Ionic Group (mmol/g)

A sample (about 0.5 g) cut out from a filter member dried to a constant weight was precisely weighed (X g), and 0.1 mol/L of an aqueous sodium hydroxide solution (70 ml) was added. The mixture was stood for 30 min and passed through a glass filter, and washed with about 50 ml of ion exchange water. The washing was mixed with the filtrate, and titrated (Y ml) with 0.1 mol/L of hydrochloric acid until the color stained with phenolphthalein disappeared. The total amount of ionic group was calculated from the following formula 1.

$$\text{Total amount (mmol/g) of ionic group}=(0.1\times 70)-0.1Y/X \quad [\text{Formula 1}]$$

(2) Density (g/c$^3$)

A nonwoven fabric was cut out in a 10 cm square, dried to a constant weight, and placed on a planar surface. A 10 cm square metal plate (500 g) was placed gently on the nonwoven fabric and the thickness (Z cm) was measured. In addition, the mass (W g) of the nonwoven fabric was measured, and the density was calculated from the following formula 2.

$$\text{Density (g/cm}^3\text{) of nonwoven fabric}=W/100/Z \quad [\text{Formula 2}]$$

A cylindrical filter member (after forming) was measured for diameter, inner diameter and height, and the volume was calculated (T cm$^3$). The filter member was dried to a constant weight and the mass was measured (S g). The density was calculated from the following formula 3.

$$\text{Density (g/cm}^3\text{) of cylindrical filter member}=S/T \quad [\text{Formula 3}]$$

(3) Preparation of Coil Filter Unit (Exclusive of Filter Member)

The filter units I–V having a round frequency as shown in Table 1 were prepared. Unit No. I had a structure shown in FIG. 3 having a coil-like bulkhead, wherein the round frequency was one. To be specific, the bulkhead had a height of 52 cm, the distance between the bulkheads was 75 mm, the gas inlet 1 had an inner diameter of 50 mm, the gas inlet 1 was positioned at 10 cm from the lower end of the bulkhead, and the gas inlet 6 had a height of 52 mm and an inner diameter of 55 mm.

The unit No. II is a realization of the embodiment of FIG. 1, wherein the bulkheads are concentric. To be specific, each bulkhead had a height of 26 cm, the first bulkhead 2-1 had an inner diameter of 260 mm, the second bulkhead 2-2 had an inner diameter of 160 mm, the third bulkhead 2-3 had an inner diameter of 55 mm, the distance between the bulkheads was 50 mm, the gas inlet 1 had an inner diameter of 40 mm, the second gas inlet 6 was 70 mm×200 mm in size, the third gas inlet 7 was 50 mm×200 mm in size, and the gas inlet 1 was positioned at 10 cm from the lower end of the bulkhead.

While the unit No. III also had a coil-like bulkhead as in the unit No. I, it was different from the unit No. I in that the round frequency was 5. To be specific, the distance between the bulkheads was shorter than in unit No. I and was 30 mm.

While the unit No. IV also had a coil-like bulkhead as in the unit No. I, it was different from the unit No. I in that the round frequency was 10. To be specific, the distance between the bulkheads was shorter than in unit No. I and was 15 mm.

The unit No. V used the first bulkhead 2-1 alone of the unit No. II, wherein the cylindrical container had a gas inlet 1 and an exhaust channel 8. Therefore, the unit No. V did not circulate the gas to be treated.

Each filter unit had a metal net to laminate a nonwoven fabric on the inside of the bulkhead, wherein the metal net was fixed onto the bottom surface. Using this metal net as a guide, a nonwoven fabric was inserted between the bulkhead outside the guide and the guide. In each filter unit, the metal net was fixed at a position that made the distance between the metal net and the inside of the bulkhead located outside this metal net 5 mm. The first bulkhead of Unit No. II was made from SUS316, and a cooling jacket was set on the outer periphery of the first bulkhead 2-1. The remaining part was made from a clear acrylic resin.

TABLE 1

| Coil filter unit No. | Number of round (rounds) | Material | Cooling jacket |
|---|---|---|---|
| I | 1 | acrylic | none |
| II | 1.8 | stainless | equipped |
| III | 5 | acrylic | none |
| IV | 10 | acrylic | none |
| V | 0 | acrylic | none |

(4) Production of Nonwoven Fabric for Filter Member to be set in Coil Filter Unit Fibers having a composition shown in Table 2 were blended, carded, and processed to give nonwoven fabrics 1–10 by the needle punch method.

The symbols in Table 2 and Table 3 mean the following.

LS: hyper water-absorbing fiber LANSEAL F produced by Toyobo Co., Ltd.:5.6 dtx51 mm/containing 2.2 mmol/g of carboxyl group MCA: moisture absorbing and releasing fiber MOIS CARE N-38B produced by Toyobo Co., Ltd.:4.4 dtx50 mm/containing 6.1 mmol/g of carboxyl group MCB: moisture absorbing and releasing fiber MOIS CARE N-97 produced by Toyobo Co., Ltd.:5.2 dtx42 mm/containing 8.5 mmol/g of carboxyl group AAF: acidic gas-adsorbing fiber N-63 produced by Toyobo Ltd.:3.2 dtx57 mm/containing 2.0 mmol/g of amino group PP: polypropylene fiber RB013 produced by Chisso Co.: 6.6 dtx64 mm/containing no ionic group HM: thermal bonding fiber 9611 produced by Toray Industries, Inc.:4.4 dtx51 mm/containing no ionic group

TABLE 2

| Nonwoven fabric No. | Composition (fiber No.:mixing ratio) unit of mixing: wt % | Total amount of ionic groups (mmol/g) | Density (g/cm$^3$) |
|---|---|---|---|
| 1 | LS:100 | 2.2 | 0.01 |
| 2 | MCA:70/AAF:20/HM:10 | 4.7 | 0.005 |
| 3 | LS:5/PP:85/HM:10 | 0.1 | 0.38 |
| 4 | LS:50/PP:50 | 1.1 | 0.25 |
| 5 | AAF:50/LS:50 | 2.1 | 0.09 |
| 6 | MCB:90/HM:10 | 7.7 | 0.01 |
| 7 | MCB:95/HM:5 | 8.1 | 0.22 |
| 8 | PP:100 | 0 | 0.01 |
| 9 | LS:100 | 2.2 | 0.003 |
| 10 | MCB:50/HM:50 | 4.3 | 0.51 |

(5) Production of Cylindrical Filter Unit (Exclusive of Cylindrical Filter Member)

The unit container 10 shown in FIG. 2 was produced from material SUS316. The container had an inner diameter of 27 cm and the exhaust channel 13 had an inner diameter of 5 cm. A manometer was set in between gas inlet 9 and exhaust pipe 13 to measure a pressure loss in the filter unit.

(6) Production of Cylindrical Filter Member

Fibers having a composition shown in Table 3 were blended and carded, and packed in a doughnut-shaped mold (outer diameter 178 mm, inner diameter 56 mm and height 130 mm). In Filter member G, the inside of the mold was divided to adjust the amount of fibers, such that the inside of the cylindrical element had a high density and that the outside thereof had a low density. The cylindrical filter members A, B, G and K were prepared by blowing a steam into the mold and drying the fibers, and the other filter members C to F and H to J were prepared by heating the mold containing the fibers at 120° C. Upon removal from the molds, however, the filter member H failed to retain the shape due to the large total amount of ionic group resulting in lower fiber strength, and the filter member K failed to retain the shape due to the low density.

(7) Production of Coil Filter Unit and Cylindrical Filter Unit

The nonwoven fabric shown in Table 2 was set in the filter unit shown in FIG. 1 and the filter member shown in Table 3 was set in the above-mentioned cylindrical filter unit.

(8) Production of Filter

The coil filter unit and the cylindrical filter unit were connected with a flexible tube to give filters shown in Table 4 and Table 5. A coil filter unit alone was used for No. 10 and a cylindrical filter unit alone was used for No. 11.

(9) Experiment Using Standard Sand

The mass of the filters and filter units shown in Table 4 and Table 5 was measured beforehand. A vacuum cleaner (Type 406, Makita Co.) was connected to the exhaust channel and the airflow rate was adjusted to 0.1 Nm$^3$/min. A powder for JIS test (JIS Z8901, third-class silica sand powder) was fed from a gas inlet of the filter unit at a rate of 10 g/min to the total amount of 2000 g.

After feeding 2000 g of the powder, a pressure loss of the filter member (mm water column) of the cylindrical filter unit was measured. The vacuum cleaner was turned off and the mass of the filter unit was measured. The difference in the mass of the filter unit between before and after the test was taken as the amount trapped (g), based on which the removal efficiency (%) was calculated from the following Equation 4. When the pressure loss of the filter member of the cylindrical filter unit exceeded 100 mm water column during feeding of the powder for JIS test, the cylindrical filter element was regarded as having been clogged. The mass of the powder fed before that point was recorded, and feeding was cancelled. After the test, the filter unit was disassembled, and changes in the condition of the filter member before and after the test was visually observed. The results are shown in Table 4 and Table 5.

Removal efficiency (%)=(trapped amount (g))/(charge amount (g) of Powder for JIS test)×100     [Equation 4]

lack of durability. When compared with No. 5, Nos. 13–16 using different materials of nonwoven fabric showed a tendency toward smaller amount of trapped particles and lower removal efficiency. When compared with No. 6, Nos. 17 and 18 using different materials of cylindrical filter members showed a tendency toward smaller amount of trapped particles and lower removal efficiency.

EXAMPLE 1
(Incorporation into Semiconductor Production Process)

A coil filter unit (unit No. II) equipped with a filter member (nonwoven fabric No. 1), and a cylindrical filter unit housing a cylindrical filter member D, which filter units being connected to each other, were incorporated into a CVD line in a semiconductor production process (exhaust gas was TEOS). The line was run for 3 weeks. In this Example, the coil filter unit was not cooled with water.

After the operation came to an end, the equipment was disassembled and the trapped amount was measured. As a

TABLE 4

| No. | Coil filter unit No. | Nonwoven fabric No. | Cylindrical filter member No. | Amount fed (g) | Powder for JIS test Trapped amount (g) | Pressure loss (mm water column) | Removal efficiency (%) Coil filter | Removal efficiency (%) Cylindrical filter | Before and after test |
|---|---|---|---|---|---|---|---|---|---|
| 1 | II | 1 | A | 2000 | 1925 | 20 | 75 | 21 | No abnormality |
| 2 | I | 1 | B | 2000 | 1648 | 4 | 57 | 25 | Cylindrical filter element somewhat deformed |
| 3 | III | 1 | C | 2000 | 1942 | 72 | 78 | 19 | No abnormality |
| 4 | IV | 1 | D | 2000 | 1978 | 63 | 84 | 15 | No abnormality |
| 5 | II | 2 | E | 2000 | 1980 | 82 | 78 | 21 | No abnormality |
| 6 | II | 3 | F | 2000 | 1991 | 93 | 60 | 40 | No abnormality |
| 7 | II | 4 | G | 2000 | 1893 | 75 | 75 | 20 | No abnormality |
| 8 | III | 5 | C | 2000 | 1909 | 70 | 79 | 16 | No abnormality |
| 9 | III | 6 | C | 2000 | 1897 | 68 | 74 | 21 | No abnormality |
| 10 | IV | 5 | none | 2000 | 1701 | — | 85 | — | No abnormality |

TABLE 5

| No. | Coil filter unit No. | Nonwoven fabric No. | Cylindrical filter member No. | Amount fed (g) | Powder for JIS test Trapped amount (g) | Pressure loss (mm water column) | Removal efficiency (%) Coil filter | Removal efficiency (%) Cylindrical filter | Before and after test | Note |
|---|---|---|---|---|---|---|---|---|---|---|
| 11 | None | — | A | 1540 | 1309 | 119 | — | 85 | No abnormality | No durability |
| 12 | V | 1 | A | 1720 | 1634 | 102 | 14 | 81 | No abnormality | Low removal efficiency of coil filter |
| 13 | II | 7 | E | 920 | 810 | 105 | 31 | 57 | nonwoven fabric degraded | No durability |
| 14 | II | 8 | E | 580 | 487 | 100 | 35 | 49 | No abnormality | No durability |
| 15 | II | 9 | E | 740 | 622 | 101 | 22 | 62 | nonwoven fabric degraded | No durability |
| 16 | II | 10 | E | 1590 | 1224 | 110 | 38 | 39 | No abnormality | No durability |
| 17 | II | 3 | I | 1450 | 870 | 108 | 42 | 18 | Particles unevenly caught on cylindrical filter | Low durability and low removal efficiency |
| 18 | II | 3 | J | 1570 | 1335 | 103 | 65 | 20 | No abnormality | No durability |

In Nos. 1–10, a given amount of the powder could be fed and superior particle removal efficiency was achieved. No. 11 using only the cylindrical filter unit showed no durability. No. 12 using the filter unit, wherein the gas did not go round, showed a heavy load on the cylindrical filter member and result, the coil filter unit trapped 960 g of the particulates and the cylindrical filter unit trapped 240 g of the particulates. Leakage of the particulates was hardly observed. Conventional CVD lines do not contain this kind of unit. The above-mentioned amounts of the trapped particulates suggest that a load on a harm removing equipment in the subsequent step can be reduced by the use of this unit. Furthermore, leakage of the particulates was checked in the exhaust channel of the unit and such leakage was not observed. Therefore, the line appeared to be operable after the test without replacement of the unit, making continuous operation for more than 3 weeks promising.

COMPARATIVE EXAMPLE 1

A cylindrical filter unit housing a cylindrical filter member G was incorporated into a CVD line in a semiconductor production process (exhaust gas was silane ammonia), and the line was run. The filter member became clogged in 2 weeks, making the running of the line thereafter unavailable. However, little particulates leaked and the amount of the trapped particulates was 1600 g.

EXAMPLE 2

A coil filter unit (unit No. II) equipped with a filter member (nonwoven fabric No. 1), and a cylindrical filter unit housing a cylindrical filter member A, which filter units being connected to each other, were incorporated into the same CVD line as in Comparative Example 1. The line was run for 2 months. The coil filter unit was cooled with water.

The filter member suffered from no trouble such as clogging. After the operation came to an end, the equipment was disassembled and the trapped amount was measured. As a result, the coil filter unit trapped 10240 g of the particulates and the cylindrical filter unit trapped 2560 g of the particulates. Leakage of the particulates was hardly observed.

As explained in the above, the filter unit or filter of the present invention incorporated into an exhaust gas line of, for example, a semiconductor production process reduces a load on a harm removing equipment, which in turn lowers the cleaning frequency and markedly prolongs the service life of the equipment. In addition, the harm removing equipment itself may be omitted depending on the kind of the exhaust gas.

This application is based on a patent application no. 336691/1999 filed in Japan, the contents of which are hereby incorporated by reference.

What is claimed is:

1. A filter unit for removing particulates from a gas to be treated, which comprises more than one gas impermeable bulkheads having a gas inlet, a filter member, and a gas shielding plate, wherein (1) said bulkheads are arranged such that a radius of said bulkheads decreases from an outer periphery side towards a center side of the filter unit, to form a channel, (2) said gas shielding plate is positioned in contact with said bulkheads between a gas inlet of an outer side bulkhead and a gas inlet of a center side bulkhead to allow communication between a channel and a gas inlet on a center side bulkhead and (3) said filter member comprises a nonwoven fabric having a density of 0.005–0.4 g/cm$^3$, and being prepared using a fiber having 0.1–8 mmol/g of an ionic group and said filter member is laminated on at least one side surface of the bulkhead without closing said channel, and wherein the gas flows through said channel from an outer side to a center side in the filter unit, being discharged from the center portion, and advances in the filter unit at least 1.5 rounds through said channel.

2. A filter unit of claim 1, further comprising a means for retaining or circulating a coolant.

3. A filter comprising the filter unit of claim 1 and a second filter unit, wherein the second filter unit comprises a cylindrical filter member having a central duct, and the filter unit of claim 1 and the second filter unit are connected to each other, such that the gas that passed through the filter unit of claim 1 proceeds to the central duct from the periphery of the cylindrical filter member.

4. The filter of claim 3, wherein the cylindrical filter member comprises a nonwoven fabric having a density of 0.005–0.4 g/cm$^3$, which fabric is prepared using a fiber having 0.1–8 mmol/g of an ionic group.

5. The filter of claim 3, wherein at least one of the filter unit and the second filter unit have a means for retaining or circulating a coolant.

* * * * *